May 9, 1961 L. THÉVENAZ 2,983,514
AUTOMATIC PHONOGRAPH, INCLUDING PICK-UP
AND RECORD-SELECTING MECHANISMS
Filed Dec. 17, 1957 5 Sheets-Sheet 2

INVENTOR
LOUIS THEVENEZ
BY Irwin S. Thompson
ATTY.

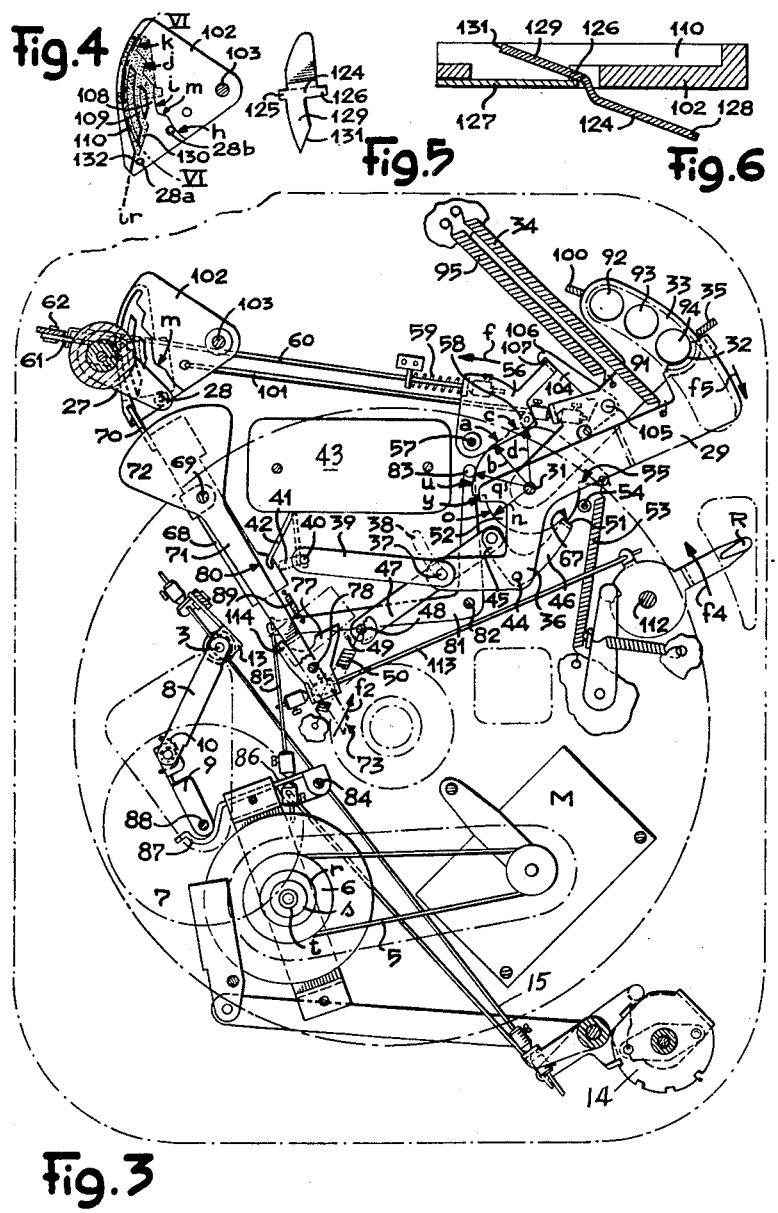

May 9, 1961
L. THÉVENAZ
2,983,514
AUTOMATIC PHONOGRAPH, INCLUDING PICK-UP
AND RECORD-SELECTING MECHANISMS
Filed Dec. 17, 1957
5 Sheets-Sheet 4
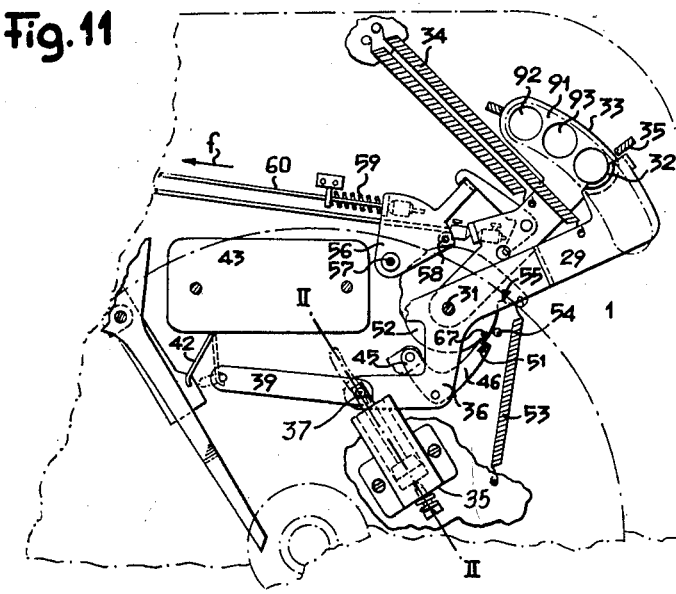
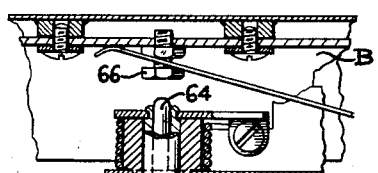
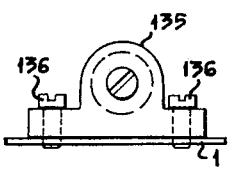
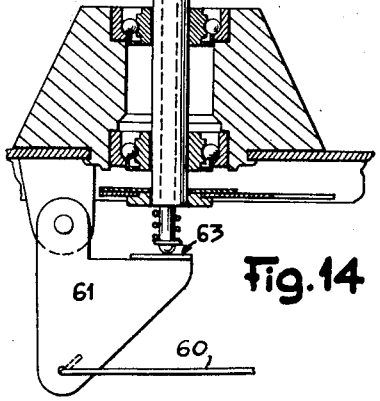
INVENTOR
LOUIS THEVENAZ
BY Irwin S. Thompson
ATTY.

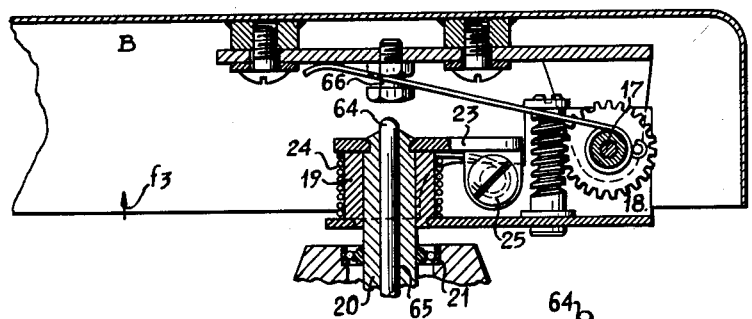
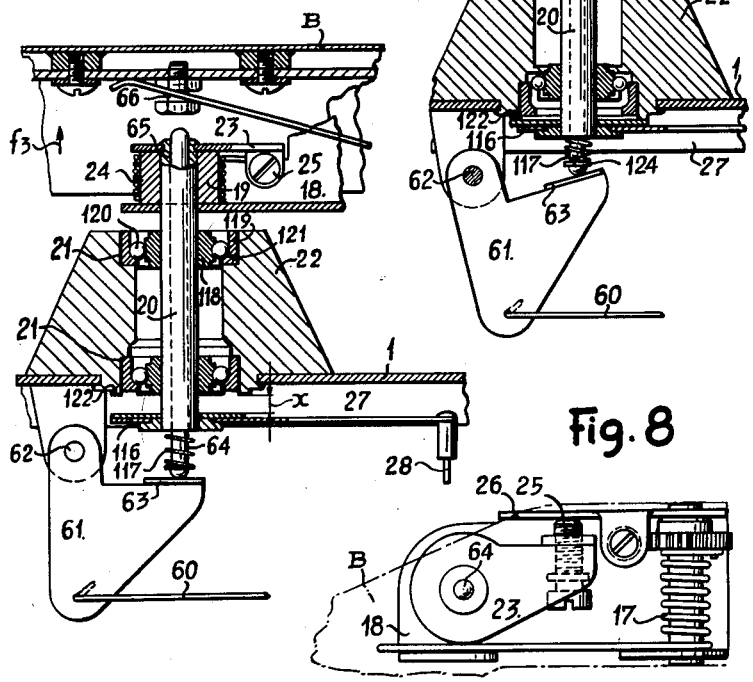

United States Patent Office 2,983,514
Patented May 9, 1961

2,983,514

AUTOMATIC PHONOGRAPH, INCLUDING PICK-UP AND RECORD-SELECTING MECHANISMS

Louis Thévenaz, Les Rasses, Sainte-Croix, Switzerland, assignor to Thorens S.A., Sainte-Croix, Switzerland, a corporation of Switzerland Filed Dec. 17, 1957, Ser. No. 703,338

Claims priority, application Switzerland Dec. 22, 1956

8 Claims. (Cl. 274—9)

The displaying on the market of long-playing records whose playing time reaches thirty minutes and more, has entirely modified the requirements imposed to the phonographs by the customers. Effectively the automatic record changing devices have no more right to exist, their selling price being too high with regard to the conveyed advantages. The auditor prefers to use a plain record playing turn-table and to change manually a record every half an hour rather than to buy a cumbersome and costly automatic record changer. However, the setting of the needle of the pick-up in the first groove of a longplaying record, driven by a plain turn-table, is a delicate operation by which the operator runs the risk of damaging the record or the pick-up.

The present invention has for its object a phonograph comprising a motor driven turn-table, a pick-up arm and at least a manual control member. This machine aims at eliminating the above mentioned drawback by the fact that it includes manually actuated devices provoking on the one hand a lateral moving-in displacement of the pick-up, bringing automatically the pick-up above the record to a definite setup diameter and, on the other hand, setting the automatic pick-up on to the record, so that these operations are automatically carried out by the operator acting on at least one manual control member, exclusive of any energy delivered by the turn-table driving motor.

The attached drawing shows schematically and by way of example, two embodiments of the phonograph according to the invention.

Fig. 3 is a top view of the mechanism.

Figs. 4 and 5 are detail views.

Fig. 6 is a detail cross section at a greater scale along line VI—VI of Fig. 4.

Fig. 7 is a cross section at a greater scale of the pick-up arm articulation.

Fig. 8 is a partial top view of the pick-up arm articulation.

Fig. 9 is an axial cross section of the pick-up arm pivot and of its rising device.

Fig. 10 is a partial view of the parts shown in Fig. 9, the rising device being in raised position.

Fig. 11 is a partial top view of a second execution form of the phonograph, certain parts being cut away for the sake of greater clearness of the drawing.

Fig. 12 is a partial cross section along line XII—XII of Fig. 11.

Fig. 13 is an end view of the braking device mounted on this machine.

Fig. 14 is a cross section of the rocking device of the pick-up arm.

Figure 1:
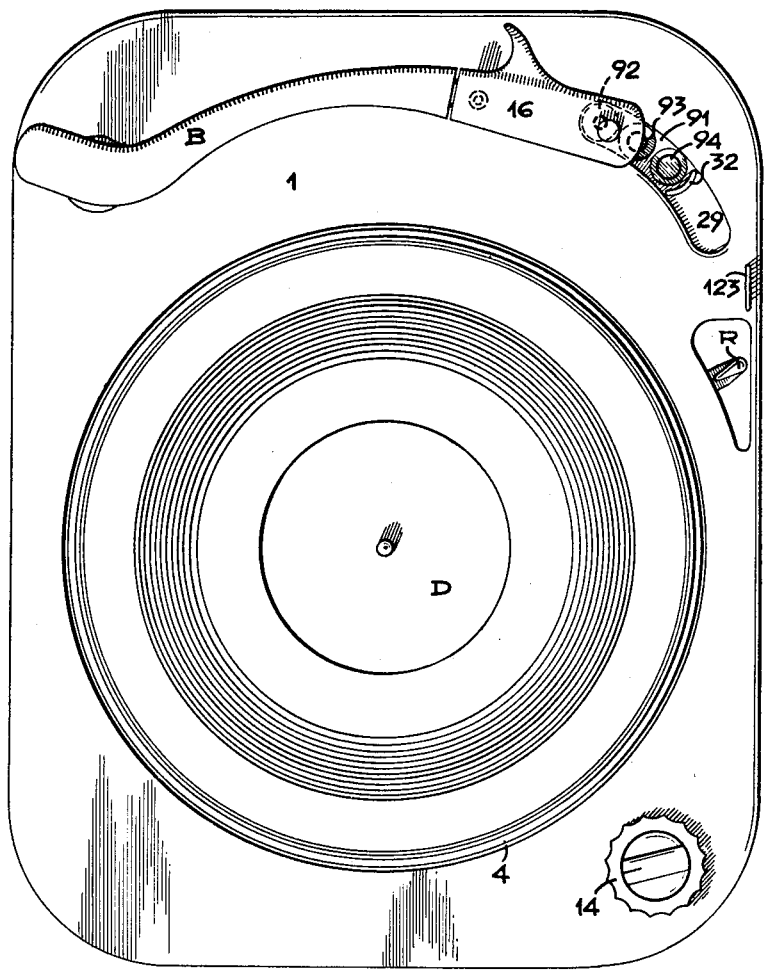
Fig. 1 is a top view.

According to the attached drawing, the phonograph comprises a base plate 1, carrying a central bearing 2, provided for the central pivot P of the turn-table D. This base plate 1 comprises a circular housing 4 coaxial to the central bearing 2 and into which penetrates partially the peripheric edge $p$ of the turn-table D. An electric motor M (Fig. 2), elastically suspended to the base plate 1, drives by means of a belt 5, an intermediate pulley 6. A driving wheel 7, carried by an articulation device comprising a first arm 8 pivoted on the base plate and a second arm 9 articulated on the extremity of arm 8, is maintained, by the action of a spring 10, in frictional contact, on the one hand, with any one of the steps $r$, $s$, $t$ of a pulley fastened to the intermediate pulley 6 and, on the other hand, with the internal surface of the peripheric edge $p$ of the turn-table. A control member 14 is connected by a rod 15 to a movable stop 13 on which bears the articulation shaft 3 of the articulation device of the driving wheel 7. The position of this stop determines the revolving plane of the wheel 7, which may thus be placed opposite any one of the steps $r$, $s$, $t$. It is thus possible for the operator to choose and adjust the driving speed of the turn-table. A driving device of this kind being described in detail in the application for Letters Patent No. 686,505 by A. Zahner, filed September 26, 1957, it is not necessary to describe it in detail here.

An arm B provided with a pick-up head 16 (Fig. 1) is pivoted with regard to a holder 18 on a horizontal axle 17. A bush 19 (Fig. 7) rigidly fastened on this holder is engaged on a vertical axle 20 revolving freely in bearings 21 (Fig. 9) supported by a fastening part 22 solid with the base plate 1. An arm 23 is rigidly fastened on the upper extremity of the vertical axle, and a spring 24 bearing on the holder 18, exerts a thrust on this arm 23, whose object is to maintain an adjustable stop 25, carried by said arm, in contact with a supporting face 26 solid with the holder 18. The lower extremity of the vertical axle 20 carries an arm 27 provided with a stop 28 constituted by a finger.

The phonograph is provided with a control device for the starting of the motor M. This device comprises a control member 29 constituted by a lever pivoted on an axle 31 solid wtih the base plate 1. This lever is placed under this base plate 1 and is provided with an actuating member 32 assuming the form of a hollow cylinder portion protruding on the upper face of this base plate through an opening 33 having the shape of an arc of circle. This lever 29 is submitted to the action of a return spring 34, which tends to maintain it in its rest position, shown in the drawing and defined by a stop 35. An arm 36 of this lever carries a little column 37 crossing a port 38 provided in the base plate 1 and carrying a push member 39. The latter carries an actuating finger 40, which crosses a port 41 provided in the base plate 1 and is located opposite an actuating member 42 of a tumbler switch 43 inserted in the feeding circuit of motor M.

The arm 36 carries moreover a pivot 44 onto which is pivoted a lever having two arms 45, 46. A connecting rod 47 is articulated on the extremity of arm 45 and carries a pin 48 which crosses a port 49 provided in the base plate 1. A spring 50 exerts a traction on this rod 47, so as to maintain a nose 51, carried by the second arm 46, in contact with the peripheric edge of a cam 52 pivoted on the axle 31 and submitted to the action of a return spring 53 tending to maintain said cam in a rest position defined by a stop 54 fixed under the base plate and onto which is bearing a nose 55 of this cam 52.

An oscillating member 56 is pivoted freely on an axle 57 fastened to the base plate 1. This member carries a roller 58, maintained in contact with the peripheric edge of cam 52 by a spring 59. A rod 60 connects this oscillating member 56 to a lever 61 pivoted on a horizontal axle 62 carried by brackets solid with the base plate 1. This lever 61 is provided with an abutting stop 63 on which bears a pusher 64 axially movable in a central bore 65 of the vertical axle 20. An adjustable stop 66 (Fig. 7) fastened on the pick-up arm B bears on the upper extremity of this pusher 64.

The cam 52 comprises a hooking face 67, co-operating with the nose 51 of arm 46, in order to provoke, under the action of the spring 34, which forms a first auxiliary motor, an angular displacement of the cam 52 from its rest position defined by the stop 54, up to its working position illustrated on Fig. 3 and for which the return spring 53 of this cam is wound up. This spring 53 constitutes a second auxiliary motor, the winding up of which is performed by the first auxiliary spring motor 34.

When the cam 52 is in its rest position, the roller 58 is in contact with a portion $a$ of the periphery of said cam assuming the form of an arc of circle of radius $b$. For this position of the cam 52, the rod 60 exerts a traction on the lever 61, in order to maintain the stop 63 in an upper position (Fig. 10) by which the pusher 64 maintains the pick-up arm in a raised position, by which the pick-up needle cannot in any case come into contact with a record placed on the turn-table.

On the contrary, when the cam 52 is in "set" position, illustrated on Fig. 3, the roller 58 is in contact with a portion $c$ of the periphery of said cam assuming the form of an arc of circle, the radius $d$ of which is larger than the radius $b$. Consequently, when the cam 52 is displaced by the auxiliary spring motor 34, from its rest position up to its set position, the oscillating member 56 is angularly displaced in direction of the arrow $f$ and pushes back the rod 60 against the action of spring 59. The stop 63 is displaced downwardly by rod 60, and the pusher 64 is displaced downwards, under the action of the pick-up weight until the position shown on Fig. 9 and the pick-up needle can come into contact with the record placed on the turn-table.

The phonograph is provided with an automatic stop device controlled by the entry of the pick-up needle into the end groove of the record. This automatic stop device comprises a lever 68 pivoted on an axle 69 secured to the base plate. This lever carries a tongue 70 placed in the path of the finger 28 driven along in the angular displacements of the pick-up arm. This lever 68 drives by friction a releasing lever 71 pivoted on the axle 69 and provided with a counterweight 72. The extremity of this releasing lever is provided with a sloping face 73, with which co-operates a knocker 74 secured to the pivot P of the turn-table. During each revolution of the turn-table, this knocker slips along the sloping face 73 and drives the lever 71 back as long as the pick-up needle is engaged in the registering grooves of a record. Then, when this needle enters the end groove of the record, which is provided with a large pitch, the pick-up arm B is displaced rapidly in the direction of the turn-table center, so as to engage the extremity of the releasing lever 71. This angular displacement is then of sufficient amplitude to cause the knocker 74, within a turn-table revolution, to strike the rear face 75 of lever 71 and draw same forth in its movement. During this displacement in the direction of the arrow $f2$, the lateral edge of lever 71 actuates:

(a) Firstly the actuating member 42 of the tumbler switch 43 so as to de-energize the feeding circuit of the motor M and the stopping of said motor.

(b) Secondly the pin 48 carried by the rod 47, which begins the oscillation of the levers 45, 46 against the action of spring 50. Consequently the nose 51 is moved away from the hooking face 67 and the cam 52 now released is driven by the second auxiliary spring motor 53 to its inoperative position.

(c) During this angular displacement of the cam 52, the roller 58 rolls from the portion $c$ to the portion $a$ of the periphery of the cam 52. The oscillating part 56 rocks under the action of its spring 59 in the direction opposite to the arrow $f$. The rod 60 exerts a traction on the lever 61 which rocks on its axle and the abutting stop 63 of which thrusts the pusher 64 upwards. The stop 66 is drawn forth in this displacement so that the pick-up arm B is angularly displaced in the direction of the arrow $f3$ (Fig. 7) to a position in which the pick-up needle can no longer come into contact with the record placed on the turn-table.

The phonograph shown is moreover provided with an automatic declutching device. This device comprises a lever 81 pivoted on an axle 82 and one of the extremities of which carries a roller 83 in contact with a portion $o$ of the periphery of the cam 52 the radius $n$ of which is smaller than the radius $q$ of a portion $u$ of the periphery of this cam 52. The second extremity of this lever 81 is connected by a rod 85 to an arm 86 pivoted on an axle 84 and the free extremity of which assumes the form of a hook 87 placed opposite an extension of the rotation axle 88 of the driving wheel 7. A return spring 89 maintains the roller 83 in contact with the periphery of the cam 52. When the roller is in contact with the portion $o$ of the cam, the hook 87 holds the articulation device in a position by which the wheel 7 is set away from the steps $r$, $s$, $t$ and from the peripheric edge $p$. On the contrary, when the roller is in contact with the portion $u$ of the periphery of the cam 52, the hook 87 releases the rotation axle of the wheel 7 and the spring 10 sets this wheel 7 against one of the steps $r$, $s$, $t$ and against the peripheric edge $p$.

The phonograph shown is moreover provided with a pick-up arm moving device bringing the needle of said pick-up above the first registering grooves of a record placed on the turn-table and also with a diameter selection device of this record.

The device comprises a selection lever 91 pivoted on the axle 31 and which is provided with a number of actuating means equal to the number of records of different diameters which the speaking machine must be able to play.

In the embodiment represented, the machine is provided for the playing of records of 7 in., 10 in. and 12 in., so that the lever 91 is provided with three actuating means each being made up of a bore 92, 93, 94 accessible through the opening 33 shaped in the arc of a circle. This lever 91 is submitted to the action of a return spring 95 which tends to maintain it in a rest position (shown on Fig. 3) and defined by a stop 100. A rod 101 connects this lever 91 to a sector 102 pivoted on an axle 103 and which presents a slope $m$ placed on the path of the extremity of the finger 28 drawn along in the displacements of pick-up arm. This slope $m$ comprises four steps $h$, $i$, $j$, $k$ (Fig. 4) which correspond respectively to the angular positions taken by the pick-up arm in its rest position and when the needle is placed above the first registering groove of a record of 12 in., 10 in. or 7 in.

A locking device prevents the actuating of the lever 91 during the playing of a record. This device comprises an oscillating lever 104 hinged at 105 on this selection lever 91 and one of the arms of which carries a hooking face 106 which is able to co-operate with a stopping face 107 carried by the oscillating lever 56 which causes the lowering and the raising of the pick-up arm. These elements are arranged so that when, during the playing of a record, the lever 56 takes a position defined by the roller 58 and the part $c$ of the cam 52, the faces 106 and 107 are engaged (position represented on the drawing), in order to prevent any actuating of the selection lever 91. Thus, when the roller 58 is on the portion $a$ of the cam 52 and the pick-up is in a raised position, these two faces 106 and 107 are no longer in contact one with another, so that the lever 91 can be freely moved.

Figure 2:
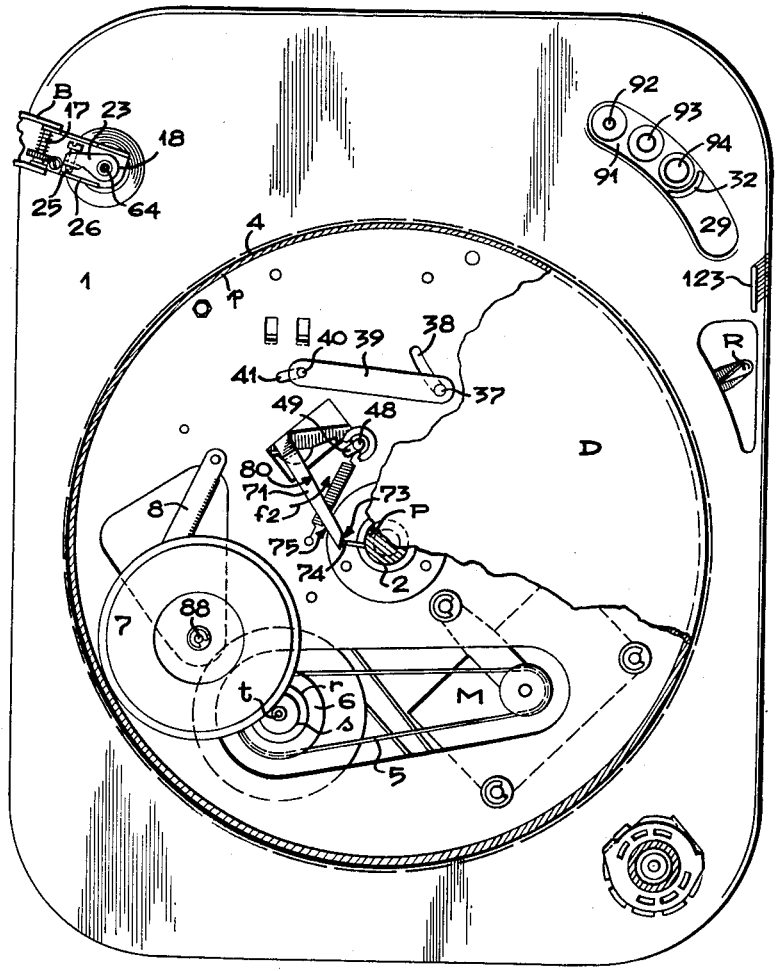
Fig. 2 is a top view, the turn-table being partially cut away.

The operation of the described phonograph is according to the following:

When the machine is at rest, the control lever 29 and the selection lever 91 are in the position shown in Fig. 2, the cam 52 is in its rest position defined by the nose 55 and the stop 54, the actuating member 42 of the switch 43 is in the position represented in dotted lines and the roller 58 of the oscillating lever 56 being in contact with the portion a of the cam 52, the abutting stop 63 of the lever 61 is in its upper position and the pick-up arm is also in a raised position.

The operator places onto the turn-table the record to be played, actuates the control member 14 of the speed change device in order to bring the driving wheel 7 opposite the steps r, s, t corresponding to the speed with which the record placed on the turn-table is to be driven. He actuates the selection lever 91 by engaging his forefinger into the bore 92, 93, 94 corresponding to the diameter of the record placed on the turn-table. The selection lever draws the sector 102 and the finger 28 comes in contact with the slope m of said sector. According to the amplitude of the displacement given to the lever 91 by the operator and which depends on the bore 92, 93, 94 into which he has engaged his fore-finger, the finger 28 slips along the slope m up to the step i, j, k and draws the pick-up arm in the direction toward the center of the turn-table with a displacement, the amplitude of which depends thus on the bore 92, 93, 94 into which the operator has engaged his forefinger, so that the pick-up needle is automatically brought above the first groove of a 7 in., 10 in. or 12 in. record respectively.

When the operator's fore-finger engaged into one of the bores 92, 93, 94 comes in contact with the actuating member 32 of the control member lever 29, this lever is drawn into the angular displacement of the selection lever 91 and causes:

(a) By the intermediary of the pusher 39 and of the finger 40, the actuating of the actuating member 42 of switch 43. The member passes then from the "cutout" position illustrated in dotted lines (Fig. 3) up to the "closing position" shown in full lines and the motor M is energized;

(b) The nose 51 is moved along the circular portion of the cam 52 and takes a position before the hooking face 67;

(c) A sloping face y carried by the lever 29 pushes back the roller 83 carried by the lever 81 against the action of the return spring 89 and causes a rocking of lever 86, the hook 87 releases the rotation axle of the driving wheel 7 and, under the action of spring 10, this wheel 7 moves into frictional contact with one of the steps r, s, t and with the peripheric edge p of the turn-table D.

Thus, the turn-table D is driven at the revolving speed necessary for the playing of the record placed on this turn-table and the pick-up needle is located above the first grooves of this record.

When the operator has completed his action on the selection lever 91 and the control lever 29, these levers return to their rest position under the action of their respective return spring.

The first auxiliary spring motor 34 draws the starting control lever in the direction of its rest position and causes, by the intermediary of this lever:

(a) The engagement of nose 51 with the hooking face 67 and the displacement of cam 52 against the action of spring 53, up to the position illustrated in Fig. 3, and maintains this cam in this biased position during the playing of the record. Thus, the first auxiliary motor 34 is a winding up motor, which provides for the winding up of the second auxiliary motor 53, which is a raising motor providing, at the time of the stopping of the machine, for the automatic raising of the pick-up arm.

(b) The actuating of roller 58 which rolls from the portion a of the periphery of the cam 52 up to the portion c of said cam. The radius d being larger than the radius b, the lever 56 rocks in direction of the arrow f and, by the intermediary of rod 60, controls the lowering of the abutting face 63 and thus the lowering of the pick-up arm, the needle of which comes to be placed in the first grooves of the record placed on the turn-table. Thus, the first auxiliary motor 34 drives the pick-up lowering device and causes the automatic needle setting onto the record;

(c) The roller 83 rolls along the sloping edge y carried by the control lever 29 and comes to rest onto the portion u of the periphery of the cam 52, the radius q of which is large enough to maintain the lever 81 in a position for which the hook 87 cannot act on the axle 88. The driving wheel 7 remains thus in frictional contact with one of the steps r, s, t and the peripheric edge p on the turn-table D;

(d) The hooking faces 106 of lever 104 and 107 of lever 56 become engaged one with the other and forbid the actuating of lever 91.

During its displacement into rest position, the selection lever 91 actuates the sector 102 in a reverse direction up to its first position shown on the Fig. 3. During this rocking of sector 102 the finger 28 slips along the one or the other of slots 108, 109, 110. Thus, during the pick-up arm lowering, said arm is maintained in its angular position by the engagement of finger 28 in one of these slots.

Gradually, as during the playing of the record, the arm B is driven by the record grooves in the direction of the turn-table rotation center. When the pick-up needle enters into the end groove of the record, which presents a large pitch, the knocker 74 strikes onto the side edge 75 of the releasing lever 71 and draws said lever along in its displacement. The displacement of lever 29 causes then as above described:

(a) The stopping of motor M by pushing the actuating member 42 of switch 43 from its energizing position to its de-energizing position;

(b) The releasing of parts 51, 67 of the locking device maintaining the cam 52 in a biased position.

The cam 52, driven by the raising motor 53, moves back to its inoperative position and causes:

(a) The raising of the pick-up arm.

(b) The displacement of the wheel 7 to a disengaged position.

(c) The releasing of the hooking faces 106 and 107 and, therefore, the releasing of lever 91.

The operator can thus move manually the pick-up arm towards the outside and proceed to the changing of the record placed on the turn-table D.

It may occur that one wants to play again the record placed on the turn-table. A device allows it without having to bring previously the pick-up arm manually in its inoperative position again. A lever 124 is freely pivoted by ears 125, 126 on the under face of sector 102, against which it is maintained by a small plate 127. Its extremity 128 acting, as a counterweight, maintains its opposed extremity 129 passing through a port 130 of sector 102, in the level of the slots 109 and 110. The extremity 129 carries a slope 131, which in this position of the lever 124, masks the outlet of the slots 109 and 110 and forms, with the sector part 132, a continuous guiding surface r. Thus, when, at the end of playing a record, and after the stopping of the phonograph, one actuates the lever 91, which rocks in direction of the arrow f5, leads, by the guiding surface ir, the finger 28 from the position 28a to the position 28b (Fig. 4) located at the beginning of the slope m and, consequently, the pick-up arm from its position at the record center to a position outside the periphery of this record, position from which the normal cycle for setting the pick-up on the record can begin. The lever 124, being freely pivoted, does not prevent the finger 28 from following the slots 109 and 110 when the sector 102 returns to its rest position.

The illustrated phonograph comprises like other known machines a rejecting device. This device comprises an actuating member R pivoted on an axle 112 and connected by a rod 113 to a lever 77 pivoted on an axle 78 and which carries an arm 114. By displacing the member R in the direction of the arrow f4 the operator causes a rocking of lever 77, the arm 114 of which actuates the releasing lever 71 in the direction of the arrow f2. As described above, lever 71 causes then the stopping of the motor and the releasing of the second auxiliary motor which actuates the pick-up raising device and the disengaging of the wheel 7.

When the record placed on the turn-table D comprises several registerings, the operator can bring manually the pick-up arm, maintained in raised position by the abutting face 63 to a position at which the pick-up needle is located above the first groove of the desired registering. At this moment, he only actuates the control member 29 by giving a thrust on the member 32 in the direction of the arrow f5, in order to cause the starting of the motor and the re-establishment of the mechanical connection between this motor and the turn-table D, as well as the tightening or winding-up of the first auxiliary motor 34. When he releases the action on the lever 29, the spring motor winds the spring motor 53 and actuates the pick-up lowering device, the needle of which is set in the first groove of the desired registering.

To prevent the pivoting of the pick-up arm on its vertical axle during its lowering, the illustrated phonograph is provided with a braking device for the arm B, set in action when this arm is in the raised position. This device, especially shown on Figs. 9 and 10, comprises a washer 116 made of a material such as compressed fiber, rigidly fastened onto the vertical axle 20, a spring 117 bearing on a washer 124 carried by the pusher 64 and acting on the under surface of the axle 20 and ball bearings 21 of a known kind such as "Magneto," wherein the internal race is axially displaceable with respect to the external race 119.

When the abutting face 63 is in its lowered position (Fig. 9), the balls 120 roll in the grooves 121 of the external races 119 and the washer 116 is located at a distance x from the under surface 122 of the fastening part 22. The pick-up arm B is then entirely free.

When the abutting face 63 is displaced upwards (Fig. 10), the spring 117 exerts a thrust on the axle 20 and moves the same upwards. This axle also moves in its displacement the internal ball races 118 as well as the washer 116 which comes in frictional contact with the surface 122 of the fastening part 22. Then, the pick-up arm articulation is not entirely free, its lateral rocking movement is braked.

As shown in Fig. 1, the disposition of the actuating means carried by the selection lever 91 presents the general aspect of part of an automatic telephone selection dial, and in order to facilitate the actuating of this lever, an abutting member 123 has been provided for the operator's thumb. This disposition has proved, at testing, very advantageous and practical. It allows effectively to assemble the selection device, the pick-up moving and the machine starting control devices, and allowing their actuating by means of one finger and by one operation.

Furthermore, due to the fact that, on the one hand, the angular displacements of the pick-up arm, to bring its needle above the first registering groove of the record to be played, are caused by the operator's action, causing the machine to start, and that, on the other hand, the pick-up lowering and raising devices are actuated by auxiliary spring motors, of which one is wound up by the above mentioned action of the operator, while the winding up of the second is secured by the first one, it is possible to simplify, in a very large measure, the whole conception of the machine, while meeting all the imposed requirements. Effectively, due to these particulars, the turn-table driving motor drives the turn-table D exclusively and, at the end of the playing, the releasing lever 71 is actuated by means of the knocker. This presents a very large simplification in the construction, with regard to the automatic record changers which comprise a series of cams driven by the motor and actuating complex devices controlling the various pick-up arm movements and the selection devices for the record diameter.

A further advantage of the described phonograph is due to the fact that at the starting of the machine, the operator produces automatically, firstly a pick-up arm displacement bringing the needle above the first registering groove of the record placed on the turn-table, then the energizing of the motor and the driving of the turn-table, while the engagement of the needle in the first registering groove is delayed until the record has reached its proper rotation speed. A further advantage of the phonograph resides in the fact that the speed of the lateral displacement of the pick-up arm is independent from the turntable rotation speed.

In Figs. 11 to 14, the only elements necessary for an understanding of the second embodiment of the machine are illustrated and the parts already described according to Figs. 1 to 10, bear the same reference characters.

According to the Fig. 11, phonograph comprises the control member 29 for the starting of the motor (not shown). This lever pivoted on the axle 31 secured to the base plate 1 is placed under this base plate 1 and comprises the actuating member 32, protruding through the opening 33. The lever 29 is submitted to the action of spring 34, which tends to maintain it in its rest position (shown in Fig. 11) and defined by the stop 35. The lever 29 comprises an arm 36 which, by the intermediary of the lever arms 45, 46, of the cam 52, of the roller 58 and of the oscillating lever 56, actuates, as described in detail according to Figs. 1 to 10, the connecting rod 60 controlling the rocking of lever 61 and the rising of the pick-up arm B (Fig. 14) by acting on the pusher 64.

At the extremity of the arm 36 of lever 29 is fixed the little column 37 crossing the elongated port 38 provided in the base plate 1. On this column are articulated the push member 39 for actuating the actuating member 42 of switch 43 controlling the motor feeding and an extremity of a rod 130. The other extremity of rod 130 is machined and threaded and carries a piston 131 made of a cuff 132 of yielding material, as leather for instance, fastened by a washer 133 and a nut 134. This piston slides in a cylinder 135, secured on the base plate 1 by two screws 136 so that the cylinder axis cuts the axis of the column 37 when the lever 29 is in its rest position. The cylinder 135 is open on the side of rod 130 and closed at its other end by a bottom 137 provided in its center with a port 138 leading to a conical bore 139 cooperating with the pin of a screw 140 with cylindrical slotted head, threaded in the bottom 137 and axially adjustable against the action of a spring 141. The piston cuff 132 is set so that when the piston 131 is moved in the direction of the arrow f6, the air is compressed between the piston 131 and the cylinder bottom 137 and can only escape through the port 138 and the adjustable pin of the screw 140.

The general operation of the phonograph mechanism is similar to that of the machine described according to Figs. 1 to 10, so that it is not necessary to describe it here again. With reference to this description and to Figs. 11 to 14, the working of the braking device, provided on this embodiment of the machine, according to the following:

When the machine is at rest, the control member 29 and the selection lever 91 are in the positions shown in Fig. 11, except that the actuating member 42 of switch 43 is in the position illustrated in dotted lines, the cam 52 is in a rest position defined by the nose 55 bearing on the stop 54 and the lever 56 submits to the action of spring 59, exerting a traction on the rod 60 and the lever 61, in the direction opposed to the arrow f, so as to maintain the pick-up arm in its raised position (not shown).

The operator, after the setting of the record to be played onto the turn-table and the selection of the turntable speed, actuates the selection lever 91 by engaging his fore-finger into the bore 92, 93, 94 corresponding to the diameter of the record placed on the turn-table. When this fore-finger comes in contact with the actuating member 32 of lever 29, this lever is drawn along into the angular displacement of lever 91 and it causes particularly:

(a) By the intermediary of the arm 36, the column 37 and the push member 39, the closing of the switch 43 and the starting of the turn-table driving motor.

(b) The slipping of the nose 51 of lever 46 along the periphery of the cam 52. This nose 51 takes a position before the hooking face 67 of this cam.

When the operator loosens his action on the selection lever 91 and the control lever 29, these levers are returned to their rest positions by their respective return spring by pivoting about the axle 31. The pivoting of the lever 29 causes:

(a) The engaging of the nose 51 with the hooking face 67 and the angular displacement of the cam 52 against the action of spring 53 up to the "wound up" position illustrated in Fig. 11.

(b) The rocking of the oscillating lever 56 in the direction of the arrow f about the axle 57, under the action of the roller 58 pushed by the angular displacement of the cam 52.

(c) The rocking of the lever 61, caused by the thrust in direction of the arrow f exerted by the rod 60 actuated by the rocking of the lever 56, and thus the lowering of the pusher 64 resting on the abutting face 63 to the position illustrated in Fig. 14.

Then, the pick-up arm B being no more maintained in the raised position by the stop 66, which was maintained in its upper position by the pusher 64, comes down under the action of its own weight, and the pick-up needle comes into contact with the record placed on the turn-table.

The rapidity of the downwards movement of arm B is a function of the displacement of the lever 29 in the direction opposed to the arrow f5 under the action of spring 34. Thus, in the first embodiment of the machine, if the operator, after the actuating of lever 29 for starting the motor, loosens suddenly this lever, the lowering of the arm B is a too rapid one and the engagement of the pick-up needle onto the record is too rough. On the contrary, the present embodiment of the machine allows it to avoid this drawback by the braking of the return of the lever 29 to its rest position. The piston rod 130 pushed by the column 37 of the arm 36 in the direction of the arrow f6 actuates the piston 131 toward the bottom 137 of cylinder 135 and compresses the air confined in the cylinder. By adjusting screw 140, one increases or reduces the passage cross section between its pin and the conical bore 139, thus controlling the escaping of the air compressed by the piston within the cylinder 135. The braking force applied to the return movement of lever 29 and, consequently, to the downward movement of pick-up arm B, can thus be set so that the pick-up needle comes into contact with the record with the desired softness in order to avoid any possibility of damaging the pick-up or longplaying record.

On the contrary, when the piston 131 is moved in the opposite direction at the starting of the phonograph, the yielding of the cuff 132 allows the air to enter with ease into the cylinder 135, so that it produces practically no depression in said cylinder which could brake the action of the operator on the lever 29. From the foregoing one can easily see that the described phonograph meets all the conditions imposed in order to avoid damage of the longplaying records at the setting of the pick-up needle onto the record, still avoiding the great complexity of the control members provided on the automatic record changing devices, and requiring for starting the phonograph one operation only to be performed by the operator.

Two embodiments of the phonograph have now been described by way of example, but it goes without saying that many different embodiments may be foreseen without departing from the scope of the claimed protection. Thus, for example, the selection and pick-up arm moving device can be provided with a control lever for each record diameter and these levers could be each connected to a cam provided with a step corresponding to the position to be taken up by the arm.

The auxiliary spring motors could be constituted by some device capable of transforming a storing part of the energy furnished by the operator at the time of the actuating of the manual control member. It is clear that in another embodiment the machine could be provided like other machines presently on the market, with many starting control members, the one causing the starting of the turntable driving motor and another causing the setting in action of an electronic amplifier.

The intermediary wheel 6 can be provided with any number of steps r, s, t to correspond to the number of desired turn-table speeds.

The described braking device could be set in another place and may act on another part of the mechanism, for example on the rod 60 or the pusher 64, controlling the raising and lowering of the pick-up arm (without departing from the scope of the invention). Furthermore this automatic braking of the pick-up arm lowering instead of being caused by a pneumatic device could be obtained by any other means, for example, by a magnetic or spring device.

I claim:

1. In a phonograph, a frame carrying a rotatively mounted supporting member, a pick-up arm pivotably connected to said supporting member for free vertical movement toward and from a record, a control member for displacing said pick-up arm, a first stop means fastened to said frame, first spring means acting on said control member and maintaining said control member in a rest position defined by said first stop means, plural actuating means spaced apart and carried by said control member for actuating said control member from its rest position against the action of said first spring means, mechanical actuating means connecting said control member to said rotatively mounted supporting member for displacing said pick-up arm one of a plurality of predetermined amounts dependent upon which of said actuating means is actuated, whereby the length of said displacement is determined by the actuated actuating means.

2. The phonograph of claim 1, and further comprising a record turntable mechanically connected to an electric motor, a switch connected in the feeding circuit of said electric motor, a second control member for controlling said switch, second spring means acting on said second control member, second actuating means carried by said second control member, second stop means fastened to said frame, said second spring means urging said second control member to a rest position defined by said second stop means, said first actuating means comprising bores in said first control member in which the operator may introduce a finger to operate said first control member, said second actuating means being located in the operating path of said first actuating means, whereby said second control member is actuated simultaneously with said first control member and causes the starting of said electric motor during the displacement of said pick-up arm.

3. A phonograph as claimed in claim 2, and further comprising means for lowering said pick-up onto the record, and means for actuating said lowering means by the return movement of said second control member to its rest position under the action of said second spring means, whereby said displacement of said pick-up arm and said starting of said electric motor take place before the lowering of said pick-up arm and the placing of the pick-up needle on the record.

4. A phonograph as claimed in claim 2, and further comprising means for locking said first control member in its rest position during the playing of a record.

5. A phonograph comprising a motor-driven turntable, a pick-up arm, manually actuated means for displacing said pick-up arm one of a plurality of selected amounts and for lowering said pick-up arm after said displacement, means for stopping said turntable after the playing of a record, means for raising said pick-up arm after the playing of a record, energy storing and releasing means for actuating said raising means energized by movement of said manually actuated means, and means operatively connecting said stopping means and said energy storing and releasing means for release of the energy thereof after the playing of a record.

6. A phonograph as in claim 5, further comprising a return spring connected to a hand-operated control member comprising a part of said manually actuated means, means connecting said control member and said energy storing and releasing means for imparting energy thereto from said spring, and locking means for said energy storing and releasing means.

7. A phonograph as in claim 6, and means actuated by said stopping means for releasing said locking means after the playing of a record, to thereby permit said energy storing and releasing means to release energy therein.

8. A phonograph as in claim 5, said raising means comprising a cam having said energy storing and releasing means operatively connected thereto.

References Cited in the file of this patent

UNITED STATES PATENTS

| | | |
|---|---|---|
| 2,081,885 | Runyan | May 25, 1937 |
| 2,305,086 | Johnson | Dec. 15, 1942 |
| 2,698,182 | Mullaney et al. | Dec. 28, 1954 |
| 2,723,859 | Stone | Nov. 15, 1955 |
| 2,845,272 | Kamler | July 29, 1958 |